United States Patent [19]

Gloudemans

[11] Patent Number: 4,882,659
[45] Date of Patent: Nov. 21, 1989

[54] VACUUM FLUORESCENT DISPLAY HAVING INTEGRAL BACKLIT GRAPHIC PATTERNS

[75] Inventor: Jeffrey M. Gloudemans, Kokomo, Ind.

[73] Assignee: Delco Electronics Corporation, Kokomo, Ind.

[21] Appl. No.: 287,208

[22] Filed: Dec. 21, 1988

[51] Int. Cl.[4] .................. F21V 9/16; G01D 11/28; B60Q 1/54
[52] U.S. Cl. .......................... 362/61; 362/30; 362/84; 73/499; 40/544; 313/496; 313/513
[58] Field of Search ............... 362/29, 30, 61, 293, 362/80, 23, 84, 263; 313/496, 513; 73/499; 40/542, 544

[56] References Cited

U.S. PATENT DOCUMENTS

| | | | |
|---|---|---|---|
| 2,802,442 | 8/1957 | Helgeby | 73/499 X |
| 2,905,807 | 9/1959 | Stevens | 362/293 |
| 2,953,668 | 9/1960 | Bassett, Jr. | 200/167 |
| 2,963,571 | 12/1960 | Roggan | 362/293 X |
| 3,053,337 | 9/1962 | Prohaska et al. | 362/29 X |
| 4,012,632 | 3/1977 | Stone | 362/30 |
| 4,162,422 | 7/1979 | Morimoto et al. | 313/513 X |
| 4,321,655 | 3/1982 | Bouvrande | 362/29 |
| 4,378,649 | 4/1983 | Cokefair | 40/544 |
| 4,447,860 | 5/1984 | Stone et al. | 362/30 |
| 4,455,774 | 6/1984 | Watanabe | 313/496 X |
| 4,603,065 | 7/1986 | Mori et al. | 40/544 X |
| 4,645,970 | 2/1987 | Murphy | 40/544 X |
| 4,661,743 | 4/1987 | Matsouka et al. | 313/496 |
| 4,667,273 | 5/1987 | Quedray | 362/84 X |

Primary Examiner—Ira S. Lazarus
Assistant Examiner—Peggy Neils
Attorney, Agent, or Firm—Mark A. Navarre

[57] ABSTRACT

A vacuum fluorescent (VF) display having integral graphic patterns backlit by an alternate light source to produce emissive graphic images in substantially the same plane as the VF graphic patterns. The backlit graphic patterns are defined by patterned openings in the anode insulation layer of a conventional VF display, and color of the backlit graphic images is determined by the color of the alternate source light, independent of the color of the light emitted from the VF phosphor.

5 Claims, 3 Drawing Sheets

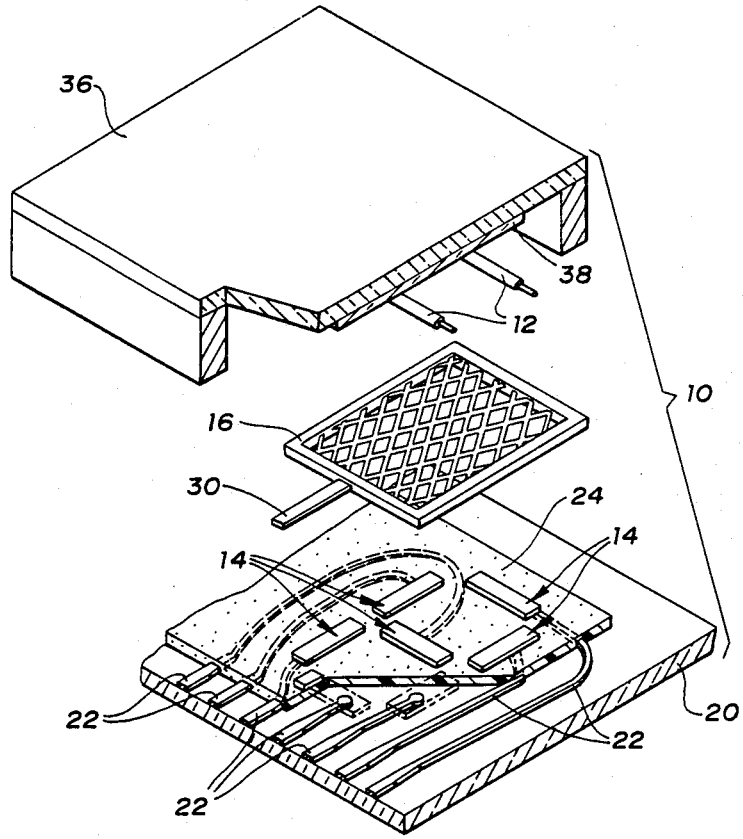
PRIOR ART   *Fig. 1*
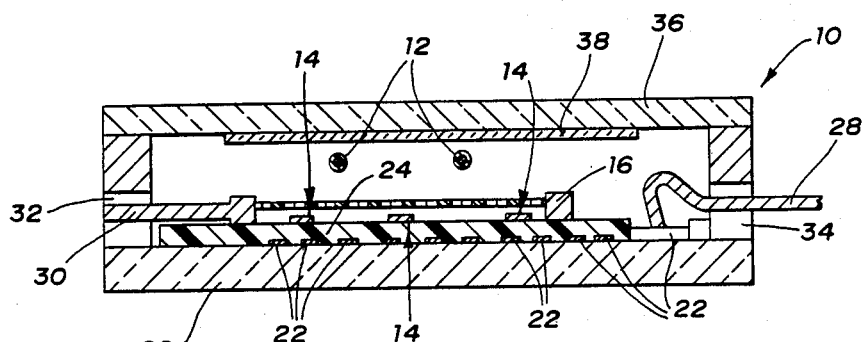
*Fig. 2*   PRIOR ART

VACUUM FLUORESCENT DISPLAY HAVING INTEGRAL BACKLIT GRAPHIC PATTERNS

This invention relates to the manufacture of vacuum fluorescent (VF) displays, and more particularly to a VF display having backlit color graphic patterns which appear in the same plane as the phosphored graphic patterns.

BACKGROUND OF THE INVENTION

VF displays are commonly used in emissive instrumentation applications such as in the instrument panel of a motor vehicle. The light emitted by the display is produced by electron bombardment of phosphor materials. A conventional VF display, depicted in FIGS. 1-3, comprises one or more relatively low potential filaments or cathodes, one or more relatively high potential phosphored anodes which define a phosphored graphic pattern, and a relatively high potential grid disposed between the filaments and the phosphored anodes. Electrons boiled off the filaments are attracted by the grid and driven into the phosphored anodes, resulting in emission of light at the phosphor surface.

The color of the light emitted from a VF display is determined by the chemical composition of the phosphor. The most commonly used phosphors emit bluish-green light since such phosphors are long lasting, and emit relatively bright light with low potential (such as 12 VDC) electron bombardment. As a result, it has been difficult to provide multicolor graphic patterns in a VF display without resorting to unproven or exotic phosphor materials and relatively high driving voltages. Attempts at filtering the bluish-green light to other colors such as yellow or red, have not been acceptable due to the reduced intensity of the filtered light. Undesirable parallax effects come into play if bezels or light-piping techniques are used to position graphic patterns in front of the display.

SUMMARY OF THE PRESENT INVENTION

The present invention is directed to an improved VF display having integral graphic patterns backlit by an alternate light source to produce emissive graphic images in substantially the same plane as the VF graphic patterns. The color of the backlit graphic images is determined by the color of the alternate source light and any color filters that may be employed, independent of the color of the light emitted from the VF phosphor.

The backlit graphic patterns are defined by patterned openings in the anode insulation layer of a conventional VF display. The insulation layer is substantially opaque, and the region of the display in which the openings are defined is backlit by a suitable light source (incandescent, LED, etc.) to produce an emissive image in the form of the patterned openings. This enables the design engineer to provide emissive multicolor graphic patterns in a VF display without resorting to the use of unproven or exotic phosphor materials and without the parallax effects associated with bezels and light-piping.

BRIEF DESCRIPTION OF THE INVENTION

FIGS. 1-3 depict a conventional VF display device.

DETAILED DESCRIPTION OF THE INVENTION

Figure 3:
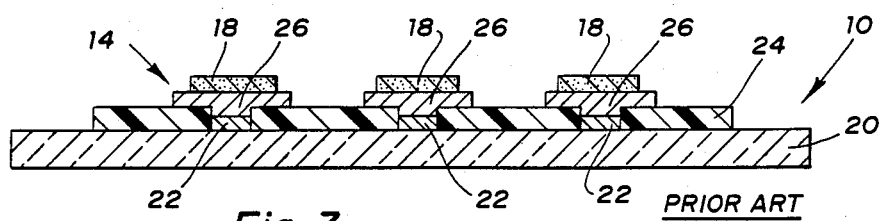

As indicated above, the conventional VF display 10 depicted in FIGS. 1-3 comprises one or more filaments (cathodes) 12, one or more phosphored anodes, generally designated by the reference numeral 14, and a grid 16 disposed between the filaments 12 and the phosphored anodes 14. The filaments 12 are energized with a relatively low potential DC or AC voltage, while the grid 16 is maintained at a relatively high DC potential. The potential difference between the filaments 12 and grid 16 for the commonly used blue-green phosphor devices may be relatively low, such as 10-12 volts. The anodes 14 to be illuminated are maintained at the same relatively high potential as the grid 16. Electrons boiled off the filaments 12 are attracted by the grid 16 due to the potential difference therebetween, and driven into phosphor material 18 deposited on the high potential anodes 14, resulting in emission of bluish-green light at the phosphor surface.

The anodes 14 are formed on a glass substrate 20 by successive deposition. The anode conductors 22 are deposited directly on the glass substrate 20. An insulation layer 24 is then deposited over the substrate 20 and conductors 22, leaving small openings, or through-holes, over the conductors 22 in the areas where the anode electrode 26 is to be formed. The insulation layer 24 is typically opaque to obscure objects located behind the display 10. The anode electrodes 26 and phosphor material 18 are then deposited in the area of the insulation layer openings, completing the substrate processing.

The grid frame 16 is then mounted on the insulation layer 24 and anode leads 28 are bonded to the anode conductors 22. The grid terminal 30 and anode leads 28 are sealed with frit glass in the areas designated by the reference numerals 32, 34. The filaments 12 are supported in a similar fashion to the grid frame 16. A glass cover plate 36 is then bonded to the substrate by frit glass. A conductive transparent film 38 is deposited on the inside surface of the cover plate 36 to shield the display from static charges.

Figure 4:
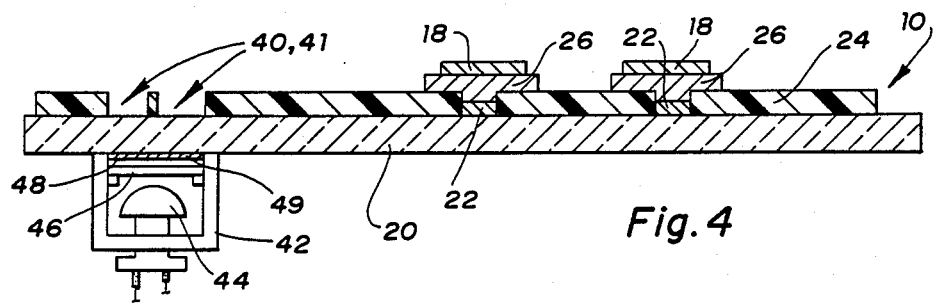
FIGS. 4 and 5 depict cross section and elevation views of a VF display device according to this invention.

A display according to the present invention is schematically depicted in section in FIG. 4, the reference numerals of FIGS. 1-3 being repeated where appropriate. According to this invention, patterned openings or through-holes in the shape of the desired graphic images are formed in the anode insulation layer 24, as indicated generally by the reference numeral 40. A backlight housing 42 is secured to the substrate 20 of the display device 10 and supports an auxiliary light source 44 such as an incandescent lamp or a light emitting diode. A filter 46 disposed in the housing 42 between the light source 44 and the substrate 20 diffuses the light and adjusts its color if necessary. If desired, color filter material 48 may be deposited directly on the substrate 20, as indicated in FIG. 4.

When the lamp 44 is energized, a graphic image in the shape of the patterned openings 40 appears in substantially the same plane as the phosphored graphic patterns defined by the anodes 14. The color of the backlit graphic image depends on the color of the lamp 44 and the filters 46, 48, independent of the VF image color. If desired, the color of the backlit graphic image may be controlled, for example by providing two or more different color lamps in the housing 42.

Figure 5:
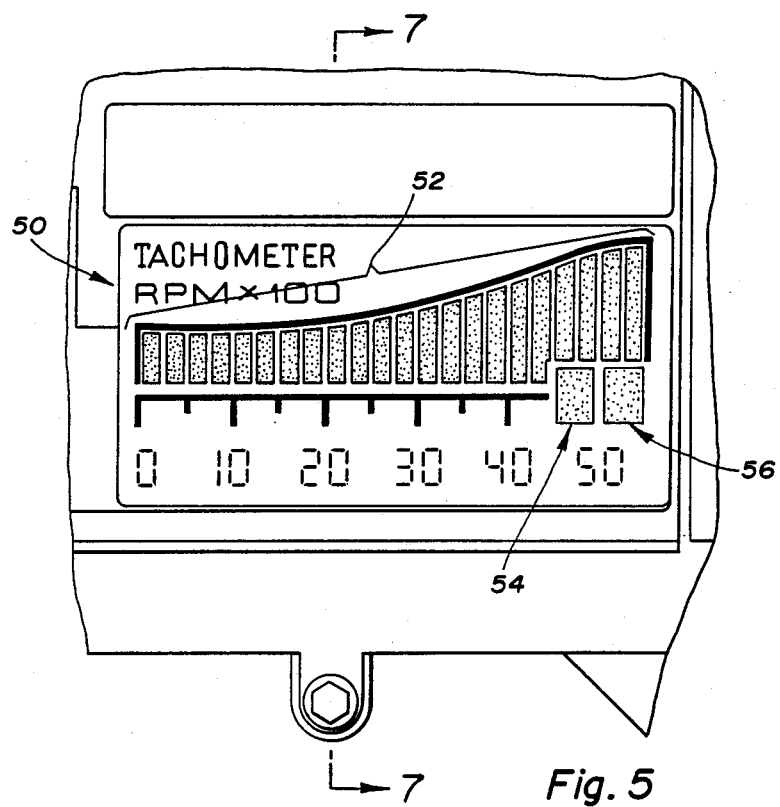
Figure 6:
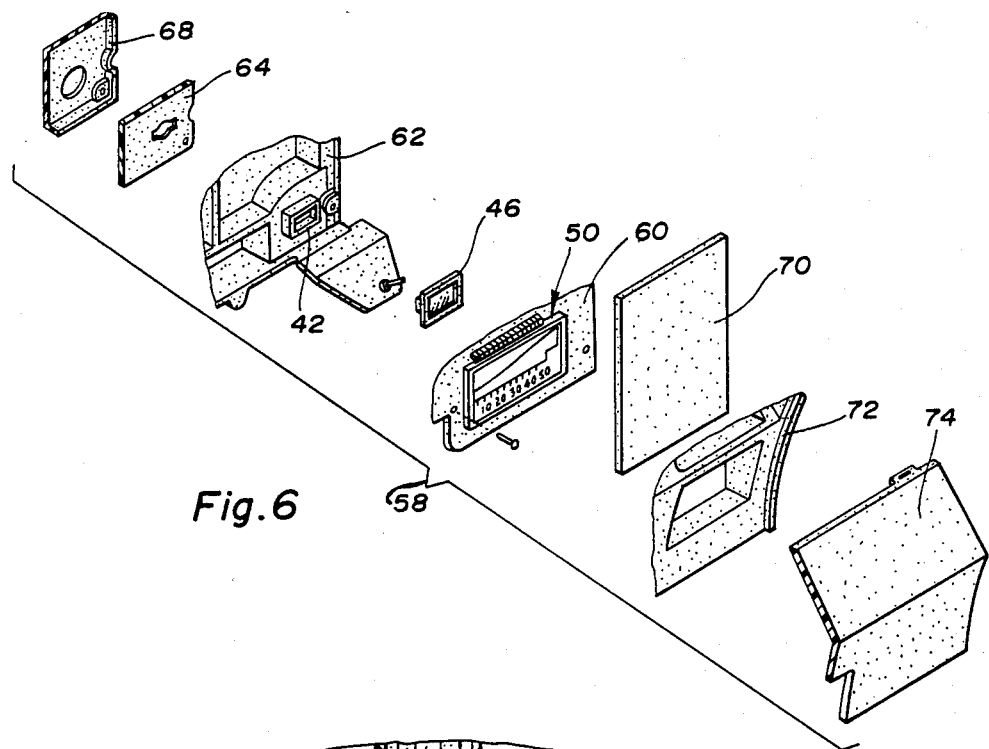
FIG. 6 is a partial exploded view of an automotive instrument panel employing a VF display according to this invention.
Figure 7:
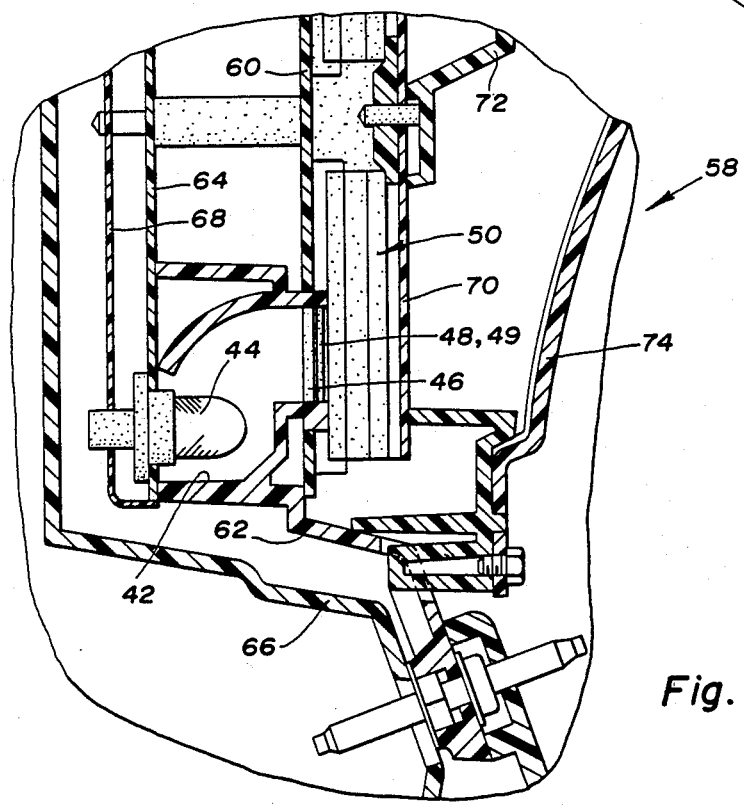
FIG. 7 is a cross section view of the panel depicted in FIG. 6.

A mechanization of the present invention in an automotive instrument panel cluster is shown in FIGS. 5-7. As best seen in FIG. 5, the device of this invention is applied to an electronic bar graph tachometer, generally designated by the reference numeral 50. The bar graph is comprised of a number of vertically oriented segments 52 which are successively lit in relation to the speed of an automotive engine. The regions designated by the reference numerals 54, 56 are defined by the yellow and red filters 48, 49, shown in FIG. 4, and function as caution and warning bands for the tachometer. The yellow caution band filter 48 is aligned with the engine speed range of 4500-5000 RPM and the red warning band filter 49 is aligned with the engine speed range of 5000-5500 RPM. In the illustrated embodiment, the lamp 44 is continuously lit so as to emit yellow light from the region 54 and red light from the region 56.

FIGS. 6 and 7 depict a portion of an automotive instrument panel 58 in which the tachometer 50 is incorporated. The tachometer 50 is mounted on a first circuit board 60, which in turn, is mounted on the inboard side of an instrument cluster case 62. A second circuit board 64 is mounted on the outboard side of the case 62 and together with the case defines the lamp housing cavity 42. The lamp 44 is inserted into the cavity 42 through a suitable opening in the circuit board 64. The case 62 is fastened to an instrument panel housing member 66, and a cover 68 is fastened to the outboard side of circuit board 64 to protect the assembly from foreign matter. An outer case comprising the display filter 70, the cluster panel 72 and the smoked filter 74 is secured to the inboard side of the case 62, completing the cluster.

While this invention has been described in reference to the illustrated embodiment, it will be understood that the scope of the invention is not limited thereto. Various modifications will occur to those skilled in the art, and displays incorporating such modifications may fall within the scope of this invention which is defined by the appended claims.

The embodiments of the invention in which an exclusive property or privilege is claimed are defined as follows:

1. In a vacuum fluorescent display device including a transparent glass substrate having front and back surfaces, a phosphored anode conductor supported on the front surface of the substrate for emitting light when bombarded with charged electrical particles, and a layer of substantially opaque insulating material covering the remainder of such front surface, the improvement comprising:
   a patterned opening in the opaque insulation layer adjacent the phosphored anode conductor; and
   a light source positioned adjacent the back surface of the transparent substrate in relation to the patterned opening such that light emanating from said source is transmitted through the substrate and patterned opening to define an emissive image in the shape of said patterned opening, which image appears to a viewer of the display in substantially the same plane as that of the phosphored anode.

2. The improvement set forth in claim 1, further comprising:
   a layer of light transmissive color filter material formed on the back surface of the substrate such that light emanating from said source is transmitted through the color filter material, substrate and patterned opening, thereby to define an emissive image in the shape of said patterned opening, the color of such image being determined by the color of said transmissive filter material.

3. In a vacuum fluorescent display device including a transparent glass substrate having a front surface adapted to support a phosphored anode conductor which emits light when bombarded with charged electrical particles, and a layer of substantially opaque insulating material covering the remainder of the substrate, the improvement wherein:
   a patterned opening is provided in the insulation layer adjacent the phosphored anode conductor;
   a open-ended housing is supported in proximity to a back surface of the substrate adjacent to said patterned opening to define a substantially closed cavity; and
   the cavity is illuminated by a light source mounted therein such that the light of said source is transmitted through the substrate and patterned opening, thereby to define an emissive image in the shape of said patterned opening which image appears in substantially the same plane as that of the phosphored anode.

4. The improvement set forth in claim 3, wherein:
   a layer of light transmissive color filter material is formed on the back surface of the substrate such that light emanating from said source is transmitted through the color filter material, substrate and patterned opening, thereby to define an emissive image in the shape of said patterned opening, the color of such image being determined by the color of said transmissive filter material.

5. A motor vehicle instrument panel housing including a vacuum fluorescent display mounted in the housing and adapted to be viewed by a vehicle occupant, the display having a transparent glass substrate, a phosphored anode conductor supported on a front surface between the substrate and the occupant for emitting light when bombarded with charged electrical particles, and a layer of substantially opaque insulating material covering the remainder of such front surface, the improvement wherein:
   a patterned opening is provided in the insulation layer adjacent the phosphored anode conductor;
   the housing includes an open-ended cavity engaging a back surface of the display substrate adjacent to said patterned opening to form a substantially closed backlighting cavity; and
   the backlighting cavity is illuminated by a light source mounted therein such that the light of said source is transmitted through the substrate and patterned opening, thereby to define an emissive image in the shape of said patterned opening which image appears to the occupant in substantially the same plane as that of the phosphored anode.

* * * * *